Figure 1:
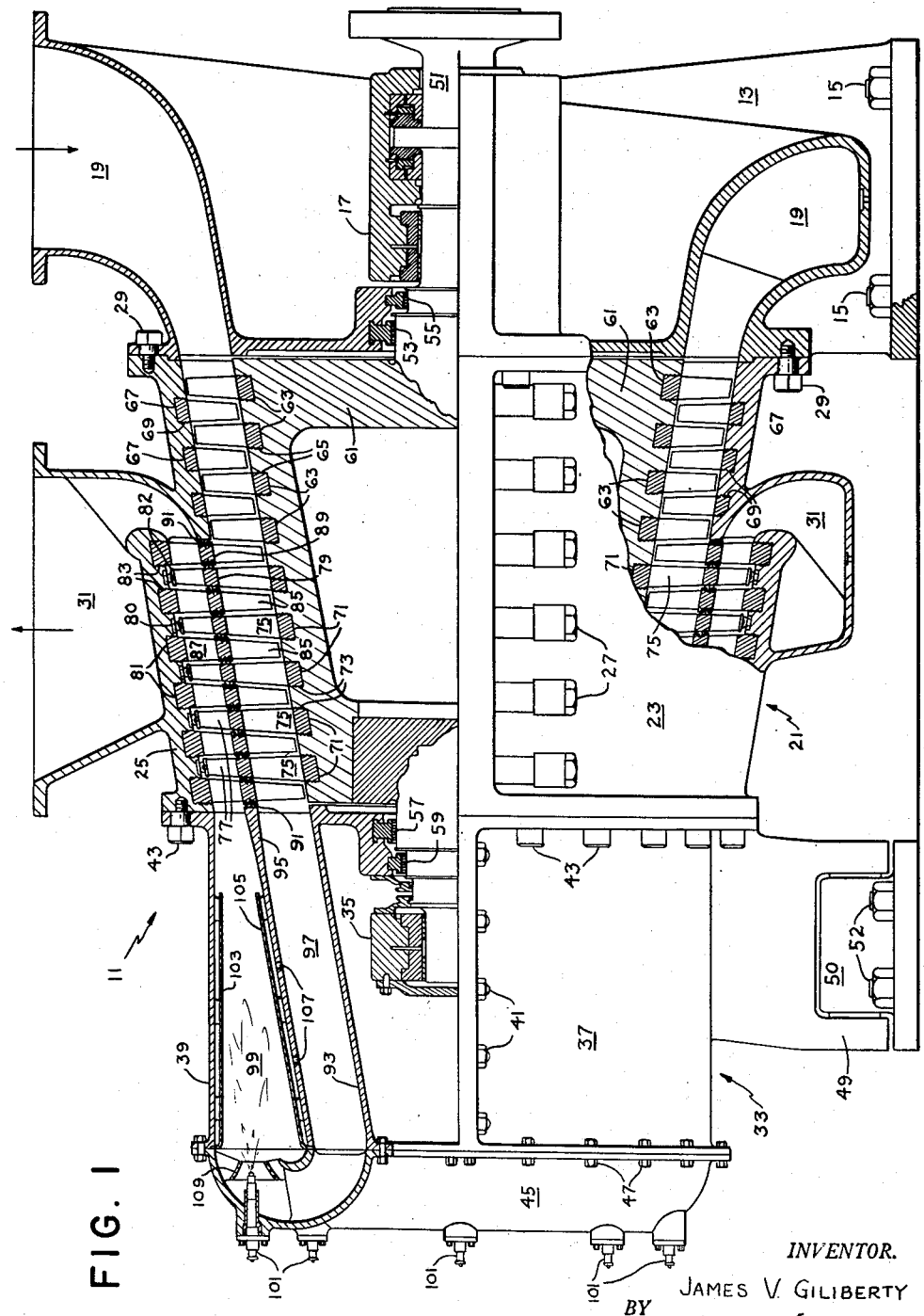

Feb. 9, 1954    J. V. GILIBERTY    2,668,413
GAS TURBINE POWER PLANT WITH DUPLEXED BLADING
Filed March 15, 1948    2 Sheets-Sheet 1

INVENTOR.
JAMES V. GILIBERTY
BY
M. O. Hayes
ATTORNEY

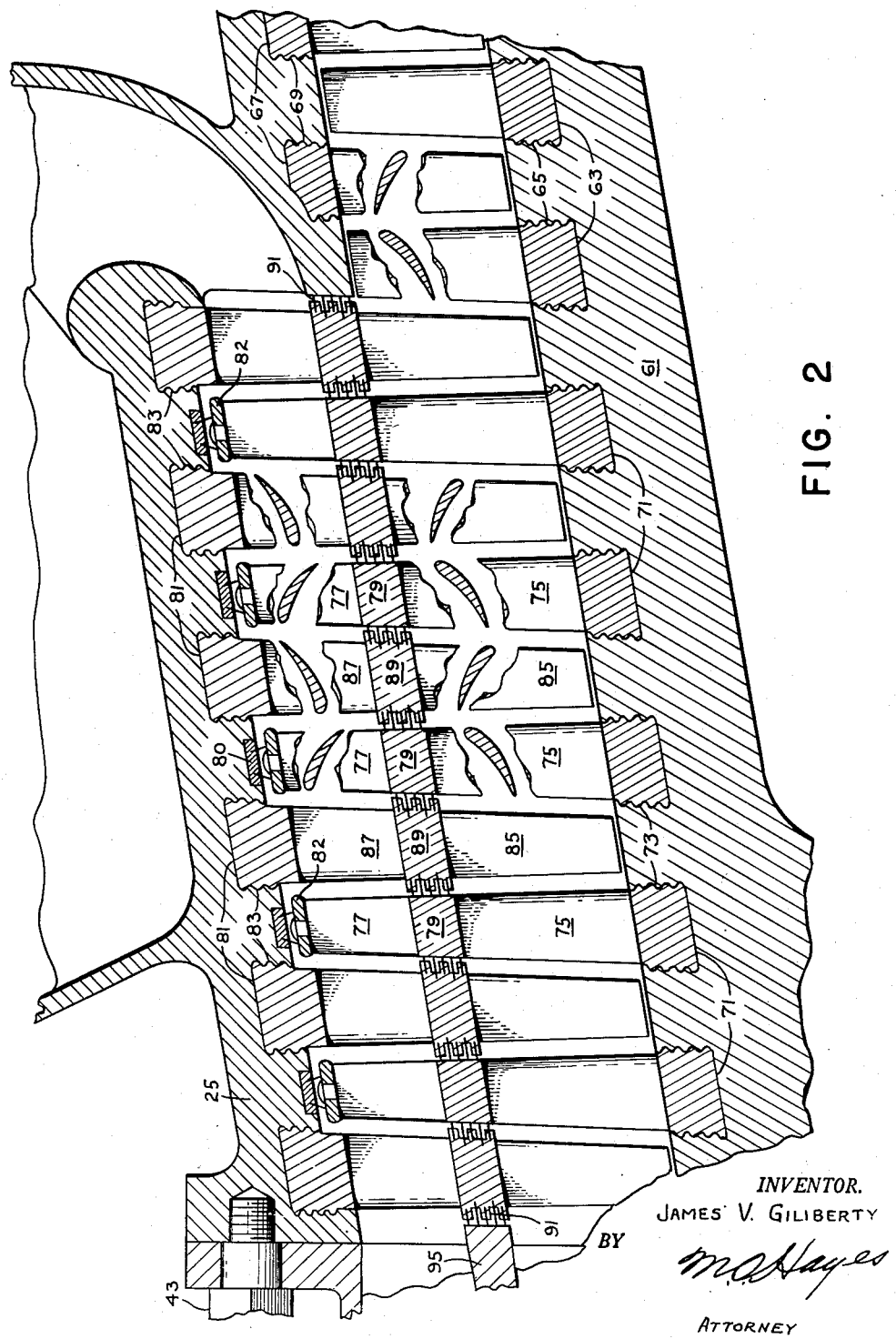

Patented Feb. 9, 1954

2,668,413

UNITED STATES PATENT OFFICE 2,668,413

GAS TURBINE POWER PLANT WITH DUPLEXED BLADING

James V. Giliberty, West Hempstead, N. Y.

Application March 15, 1948, Serial No. 15,038

11 Claims. (Cl. 60—39.16)

(Granted under Title 35, U. S. Code (1952), sec. 266)

This invention relates to improvements in combustion gas turbines and more particularly pertains to combustion gas turbines including a compressor, a combustion chamber in which the compressed air is mixed with atomized fuel and ignited, and a turbine driven by the burning gases, wherein said turbine drives said compressor and a shaft.

Past improvements in combustion gas turbines as prime movers have been directed principally to the development of materials that can withstand relatively high temperatures and to the improvement of air-compressor efficiency generally. The use of heat regenerators and intercoolers in conjunction with gas turbines has had a marked effect in meeting this problem of improving thermal efficiency. However, the predominant factor in obtaining high thermal efficiency in the gas turbine is the use of high inlet gas temperatures. Accordingly, the limitations to the temperatures that materials that are known presently can withstand has prescribed the scope of development along such lines.

Rearrangement of known gas turbine elements, and the addition of novel elements, is likewise an avenue of development productive of structure permitting higher inlet gas temperatures and higher thermal efficiency.

The primary object of this invention is to provide a combustion gas turbine characterized by a thermal efficiency increased considerably over the thermal efficiency of gas turbines heretofore employed, wherein inlet gas temperatures of an extraordinarily high order can be used.

Another object is to provide a combustion gas turbine having an integral air compressor wherein part of the turbine portion of the blades are in the direct path of flow of the compressor air, thereby affording a positive means of cooling both the stationary and the rotating turbine portions of the blades.

A further object is to provide a combustion gas turbine wherein compressor and turbine functions are both effected with each of a plurality of blades, whereby optimum thermal conductivity in cooling the turbine portions of each blade is realized by reason of the homogeneity of the compressor and turbine portions of each such blade.

Still another object is to provide a combustion gas turbine having bearing saddles connected indirectly to the high temperature casing so that heat transmission to the rotor bearings is at a minimum and so that efficient cooling and lubrication of the bearings is facilitated.

Other objects and many of the attendant advantages of this invention will be readily appreciated as the same becomes better understood by reference to the following detailed description when considered in connection with the accompanying drawings wherein:

Fig. 1 is an elevational view of a combustion gas turbine, partly in section showing a preferred embodiment of the invention; and Fig. 2 is a sectional elevation of a portion of the compressor and turbine sections thereof, shown on an enlarged scale.

Similar numerals refer to similar parts throughout the several views.

A casing or turbine shell 11 comprises a first end element 13 adapted to be secured or anchored to a standard by means of a plurality of bolts 15, said end element 13 carrying a thrust bearing 17 for the main drive shaft hereinafter described and including an air inlet chamber 19 adapted to communicate with a first compressor stage hereinafter described; a frusto-conical medial element 21 comprising half-shells 23 and 25 secured together by a plurality of bolts 27 and secured to end element 13 by a plurality of bolts 29, said half-shells 23 and 25 including end exhaust chamber 31 communicating with a final turbine stage hereinafter described; and a second end element 33 carrying a sleeve bearing 35 for the main drive shaft hereinafter described, said end element 33 comprising half-shells 37 and 39 secured together by a plurality of bolts 41 and secured to medial elements 21 by a plurality of bolts 43, said end element 33 further including a cap member 45 secured to half-shells 37 and 39 by means of a plurality of bolts 47. Said end element 33 carries an axial floating foundation fastening 49 adapted to ride on saddle 50, which is adapted to be secured or anchored to a standard by means of a plurality of bolts 52. Said foundation fastening 49 affords free and unrestrained axial expansion movement of said turbine. Said end element 33 defines an annular chamber hereinafter described.

Main drive shaft 51 is carried rotatably in thrust bearing 17 and sleeve bearing 35. Labyrinth seals 53 and 55 carried on the internal periphery of end element 13 saddle main drive shaft 51 at points in the turbine interior of thrust bearing 17 and thereby prevent leakage of fluid from the interior of medial element 21 through said bearing 17. Labyrinth seals 57 and 59 carried on the internal periphery of frusto-conical member 93 hereinafter described, saddle main drive shaft 51 at points in the turbine interior of sleeve bearing 35 and prevent leakage of fluid from medial element 21 through said bearing 35. Rotor 61 is a frusto-conical shell secured fixedly to main drive shaft 51, being carried thereon internal medial element 21 and having a major diameter proximate end element 13 and a minor diameter distal said end element. Said rotor and said medial element define an annular chamber communicating between air inlet chamber 19 and the annular chamber of the second end element 33. A plurality of rotor bladings 63 are mounted in spaced relation on the external periphery of said rotor 61 at the portion of said rotor proximate first end element 13. Each of said bladings comprises a multiplicity of blades of airfoil cross section and of similar aspect, each of said blades having a serrated root 65, whereby attachment of said blades to the rotor 61 is effected. A plurality of stator bladings 67 are mounted similarly on the internal periphery of medial element 21 and are each disposed between adjoining rotor bladings 63. Each of said stator bladings 67 comprises a multiplicity of blades of airfoil cross section and of similar aspect, preferably the reverse of the cross sectional aspect of the blades of the rotor bladings, as shown in Fig. 2, each of said blades of the stator bladings having a serrated root 69 whereby attachment to the medial element 21 is effected, said bladings 63 and 67 thus forming a plurality of compressor stages.

A plurality of rotor bladings 71 are mounted in spaced relation on the external periphery of said rotor 61, extending substantially the entire remaining length of said rotor. Each of said bladings comprises a multiplicity of blades of similar aspect, each of said blades having a serrated root 73 whereby attachment to the rotor 61 is effected, a portion 75 of airfoil cross section extending from said root 73, a portion 77 of airfoil cross section and of aspect reverse to that of the portion 75, said portion 77 being distal root 73, and an intermediate section 79 dividing portions 75 and 77, as shown in Fig. 2. Shroud rings 82 cap blade portions 77. Sealing strip rings 80 are likewise provided.

A plurality of stator bladings 81 are mounted on an interior periphery of medial element 21, one of said bladings 81 being positioned between each adjacent pair of rotor bladings 71 and one of said bladings 81 being positioned beyond each distal rotor bladings 71. Each of said bladings 81 comprises a multiplicity of blades of similar aspect, each of said blades having a serrated root 83 whereby attachment to the inner periphery of the medial element 21 is effected, a portion 87 of airfoil cross section extending from said root 83, a portion 85 of airfoil cross section and of aspect reverse to that of the portion 87, said portion 85 being distal root 83, and an intermediate section 89 dividing portions 85 and 87. Each said portion 85 is preferably reverse the cross sectional aspect of the adjacent portions 75 of the blades of the rotor, and each said portion 87 is preferably reverse of the cross sectional aspect of the adjacent portions 77 of the blades of the rotor, as shown in Fig. 2.

Intermediate sections 79 and 89 each form a complete annulus dividing the chamber defined by rotor 61 and medial element 21 into concentric frusto-conical chambers. Said sections are provided with labyrinth seals 91 therebetween permitting rotation of the rotor bladings relative the stator bladings while maintaining a fluid seal between the compressor stages formed by blade portions 75 and 85 and the turbine stages formed by blade portions 77 and 87.

The second end element 33 carries a first frusto-conical member 93 and a second frusto-conical member 95, generally concentric with member 93 and intermediate member 93 and the inner periphery of said element 33. Said member 95 mates with the labyrinth seal 91 distal the first end element 13 to define, internal of element 33, concentric frusto-conical chambers 97 and 99, said chamber 97 conducting fluid discharged from the compressor stages hereinbefore described past a plurality of fuel atomizing nozzles 101 carried by cap 45 and into chamber 99, wherein combustion is effected and the products of combustion discharged into the first of the turbine stages hereinabove described. A suitable means to supply fuel to said nozzles 101 and means to ignite said fuel (not shown) are provided.

Combustion-zone shield 103 is carried on the internal periphery of the second end element 33 and combustion-zone shield 105 is carried on the facing periphery of member 95. A plurality of cooling air passages or vents 107 are provided in member 95 whereby the temperature of the portion of the outer casing proximate the combustion chamber can be lowered. Combustion air deflectors 109 hood the fuel nozzles 101.

In operation, a suitable starting motor (not shown) initiates actuation. Air is introduced into air inlet chamber 19 and is driven through the successive compressor stages and then through chamber 97 to the combustion chamber 99, where combustion of fuel admitted through nozzles 101 is effected. The products of combustion drive the successive turbine stages and discharge through exhaust chamber 31. Rotation of main drive shaft 51 is effected through the torque exerted by the turbine stages.

The general characteristics of the combustion gas turbine hereinabove described are apparent. Inlet gas temperatures appreciably higher than the inlet gas temperatures of gas turbines heretofore known can be realized, thereby increasing considerably the thermal efficiency of the device. The arrangement disclosed, wherein the air compressor is an integral part of the turbine, allows part of the gas turbine blades to be in the direct path of flow of the compressor air, thereby affording a positive means of cooling both the stationary and the rotating turbine blades.

The combination of air compressor and turbine stages into a single unit reduces considerably the size and weight of the structure relative conventional types of combustion gas turbines of equivalent output. Further, the provision of structure wherein the bearing saddles are connected indirectly only to the high-temperature casing keeps heat transmission to the bearings at a minimum and thus facilitates cooling of the rotor bearings. In general the compact arrangement of the compressor spaces makes heat losses a minimum.

The homogeneity of each of the compressor and turbine rotor bladings and the homogeneity of each of the compressor and turbine stator bladings assures optimum thermal conductivity between the turbine and compressor portions of each such blading and thus permits the use of appreciably higher inlet gas temperatures. The arrangement of compressor and turbine stages is such that a gradient from atmospheric pressure upwards is effected in the successive compressor stages and a gradient from peak pressure downward is effected in the turbine stage. With said two gradients being disposed in opposite directions, the pressure differential between the gas side and the air side of the blading at any one stage is small. For example, at the gas inlet stage of the turbine the pressure differential between the gas side and the air side of the blading is negligible, making the pressure differential on the labyrinth seal 91 at that position negligible. Maximum pressure differential between the gas side and the air side of bladings 71 is at the gas outlet stage of the turbine, but even here the differential is reduced by reason of the increase in pressure effected by the compressor stages preceding that position.

Obviously many modifications and variations of the present invention are possible in the light of the above teachings. It is therefore to be understood that within the scope of the appended claims the invention may be practiced otherwise than as specifically described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

I claim:

1. In a turbine of the class described, a shaft, a plurality of compressor stages through which fluid is adapted to flow in series, a combustion chamber communicating with the end compressor stage of said series, and a plurality of turbine stages arranged in series radially outward from said compressor stages and communicating with the outlet of said combustion chamber, said turbine stages and selected compressor stages each having a common rotor blade driven uni-directionally by said shaft and a common stator blade.

2. In a turbine of the class described, a fixed casing, a drive shaft carried rotatably in bearings in said casing, a rotor secured fixedly to said drive shaft, a first plurality of bladings carried on the exterior periphery of said rotor for uni-directional rotation, a second plurality of bladings carried on the internal periphery of said casing and intercalated with said first bladings, each blading having a radially inner portion defining a compressor part and a radially outer portion defining a turbine part, and a combustion chamber communicating between the final compressor and the first turbine portions.

3. In a single open-cycle compressor and turbine system of the class described, a casing having an inlet for driving fluid, a shaft mounted rotatably in said casing, a plurality of compressor stages extending along and encircling said shaft and being in communication with said inlet, a plurality of turbine stages extending along and encircling selected compressor stages and being in communication with said compressor stages through a combustion chamber adjacent the compressor outlet and turbine inlet, said combustion chamber being carried by said casing within the radial limits defined by said compressor and turbine stages, and an outlet for driving fluid communicating with the final turbine stage, said selected compressor stages and said turbine stages having common rotor bladings driven by said shaft and common stator bladings carried by said casing.

4. In a single open-cycle compressor and turbine system of the class described, a casing having an inlet for driving fluid, a shaft mounted rotatably in said casing, a plurality of compressor stages extending along and encircling said shaft and being in communication with said inlet, a plurality of turbine stages extending along and encircling selected compressor stages and being in communication with said compressor stages through a combustion chamber adjacent the compressor outlet and turbine inlet, said combustion chamber being carried by said casing within the radial limits defined by said compressor and turbine stages, the direction of flow of driving fluid in said compressor stages and turbine stages being opposite, and an outlet for driving fluid communicating with the final turbine stage, said selected compressor stages and said turbine stages having common rotor bladings driven by said shaft and common stator bladings carried by said casing.

5. In a single open-cycle compressor and turbine system of the class described, a casing having an inlet for driving fluid, a shaft mounted rotatably in said casing, a plurality of compressor stages extending along and encircling said shaft and being in communication with said inlet, a plurality of turbine stages extending along and encircling selected compressor stages and being in communication with said compressor stages through a combustion chamber adjacent the compressor outlet and turbine inlet, said combustion chamber being carried by said casing within the radial limits defined by said compressor and turbine stages, and an outlet for driving fluid communicating with the final turbine stage, said selected compressor stages and said turbine stages having common rotor bladings driven uni-directionally by said shaft and common stator bladings carried by said casing, each of said bladings having an intermediate portion of a heat-conducting material, said intermediate portion defining the partition between said compressor and turbine stages.

6. In a single open-cycle compressor and turbine system of the class described, a casing having an inlet for driving fluid, a shaft mounted rotatably in said casing, a plurality of first compressor stages and a plurality of second compressor stages extending along and encircling said shaft, the first of said first compressor stages being in communication with said inlet, a plurality of turbine stages extending along and encircling said second compressor stages, the first of said turbine stages being in communication with the last of said compressor stages through a combustion chamber adjacent the compressor outlet and turbine inlet, said combustion chamber being carried by said casing within the radial limits defined by said compressor and turbine stages, and an outlet for driving fluid communicating with the final turbine stage, said first compressor stages having rotor bladings driven uni-directionally by said shaft and stator bladings carried by said casing, said second compressor stages and said turbine stages having common rotor bladings driven in the same direction as that of said first compressor stages rotor bladings by said shaft and common stator bladings carried by said casing, each of said common bladings having an intermediate portion of a heat-conducting material, said intermediate portion defining the partition between said compressor and turbine stages.

7. In a single open-cycle compressor and turbine system of the class described, a casing having an inlet for driving fluid, a shaft mounted rotatably in said casing, a plurality of first compressor stages and a plurality of second compressor stages extending along and encircling said shaft, the first of said first compressor stages being in communication with said inlet, a plurality of turbine stages extending along and encircling said second compressor stages, the first of said turbine stages being in communication with the last of said compressor stages through a combustion chamber adjacent the compressor outlet and turbine inlet, said combustion chamber being carried by said casing within the radial limits defined by said compressor and turbine stages, and an outlet for driving fluid communicating with the final turbine stage, said first compressor stages having rotor bladings driven uni-directionally by said shaft and stator bladings carried by said casing, said second compressor stages and said turbine stages having common rotor bladings driven in the same direction as that of said first compressor stages rotor bladings by said shaft and common stator bladings carried by said casing, each of said common bladings having an intermediate portion of a heat-conducting material, said intermediate portion defining the partition between said compressor and turbine stages, the direction of flow of driving fluid in said compressor stages and turbine stages being opposite.

8. In a single open-cycle compressor and turbine system of the class described, a casing having an inlet for driving fluid, a shaft mounted rotatably in said casing, a plurality of first compressor stages and a plurality of second compressor stages extending along and encircling said shaft, the first of said first compressor stages being in communication with said inlet, a plurality of turbine stages extending along and encircling said second compressor stages, the first of said turbine stages being in communication with the last of said compressor stages through a combustion chamber adjacent the compressor outlet and turbine inlet, said combustion chamber being carried by said casing within the radial limits defined by said compressor and turbine stages, and an outlet for driving fluid communicating with the final turbine stage, said first compressor stages having rotor bladings driven uni-directionally by said shaft and stator bladings carried by said casing, said second compressor stages and said turbine stages having common rotor bladings driven in the same direction as that of said first compressor stages rotor bladings by said shaft and common stator bladings carried by said casing, each of said common bladings having an intermediate portion of a heat-conducting material, said intermediate portion defining the partition between said compressor and turbine stages, the direction of flow of driving fluid in said compressor stages and turbine stages being opposite and substantially parallel to the axis of said shaft.

9. In a single-open-cycle compressor and turbine system of the class described, a casing having an inlet for driving fluid, a shaft mounted rotatably in said casing, a plurality of first compressor stages and a plurality of second compressor stages extending along and encircling said shaft, the first of said first compressor stages being in communication with said inlet, a plurality of turbine stages extending along and encircling said second compressor stages, the first of said turbine stages being in radial alignment with the last of said compressor stages and being in communication with the last of said compressor stages through a combustion chamber adjacent the compressor outlet and turbine inlet, said combustion chamber being carried by said casing, and an outlet for driving fluid communicating with the final turbine stage, said first compressor stages having rotor bladings driven by said shaft and stator bladings carried by said casing, said second compressor stages and said turbine stages having common rotor bladings driven by said shaft and common stator bladings carried by said casing, each of said common bladings having an intermediate portion of a heat-conducting material, said intermediate portion defining the partition between said compressor and turbine stages, the direction of flow of driving fluid in said compressor stages and turbine stages being opposite and substantially parallel to the axis of said shaft.

10. In a single-open-cycle compressor and turbine system of the class described, a casing having an inlet for driving fluid, a shaft mounted rotatably in said casing, a plurality of first compressor stages and a plurality of second compressor stages extending along and encircling said shaft, the first of said first compressor stages being in communication with said inlet, a plurality of turbine stages extending along and encircling said second compressor stages, shroud rings capping the rotors of said turbine stages, the first of said turbine stages being in communication with the last of said compressor stages through a combustion chamber adjacent the compressor outlet and turbine inlet, said combustion chamber being carried by said casing, and an outlet for driving fluid communicating with the final turbine stage, said first compressor stages having rotor bladings driven by said shaft and stator bladings carried by said casing, said second compressor stages and said turbine stages having common rotor bladings driven by said shaft and common stator bladings carried by said casing, each of said common bladings having an intermediate portion of a heat-conducting material, said intermediate portion defining the partition between said compressor and turbine stages, the direction of flow of driving fluid in said compressor stages and turbine stages being opposite and substantially parallel to the axis of said shaft.

11. In a single-open-cycle compressor and turbine system of the class described, a casing having an inlet for driving fluid, a shaft mounted rotatably in said casing, a plurality of first compressor stages and a plurality of second compressor stages extending along and encircling said shaft, the first of said first compressor stages being in communication with said inlet, a plurality of turbine stages extending along and encircling said second compressor stages, shroud rings capping the rotors of said turbine stages, annular seal elements carried by said casing adjacent said shroud rings, the first of said turbine stages being in communication with the last of said compressor stages through a combustion chamber adjacent the compressor outlet and turbine inlet, said combustion chamber being carried by said casing, and an outlet for driving fluid communicating with the final turbine stage, said first compressor stages having rotor bladings driven by said shaft and stator bladings carried by said casing, said second compressor stages and said turbine stages having common rotor bladings driven by said shaft and common stator bladings carried by said casing, each of said common bladings having an intermediate portion of a heat-conducting material, said intermediate portion defining the partition between said compressor and turbine stages, the direction of flow of driving fluid in said compressor stages and turbine stages being opposite and substantially parallel to the axis of said shaft.

JAMES V. GILIBERTY.

References Cited in the file of this patent

UNITED STATES PATENTS

| Number | Name | Date |
|---|---|---|
| 885,032 | De Ferranti | Apr. 21, 1908 |
| 2,391,779 | Griffith | Dec. 25, 1945 |
| 2,398,140 | Heppner | Apr. 9, 1946 |
| 2,413,225 | Griffith | Dec. 24, 1946 |
| 2,414,410 | Griffith | Jan. 14, 1947 |
| 2,489,683 | Stalker | Nov. 29, 1949 |
| 2,548,975 | Hawthorne | Apr. 17, 1951 |

FOREIGN PATENTS

| Number | Country | Date |
|---|---|---|
| 51,150 | Austria | Dec. 11, 1911 |
| 14,641B | Great Britain | July 15, 1905 |
| 577,017 | Great Britain | May 1, 1946 |
| 215,484 | Switzerland | June 30, 1941 |